March 14, 1961     C. B. KING ET AL     2,974,399
CUTTER FOR GEARS OF TAPERING TOOTH DEPTH
Filed March 27, 1958     3 Sheets-Sheet 1
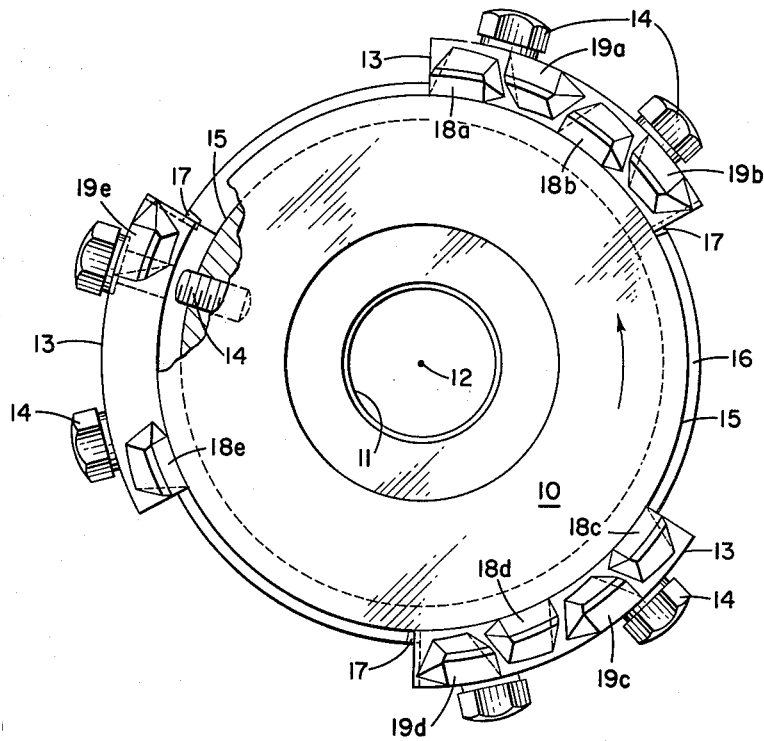
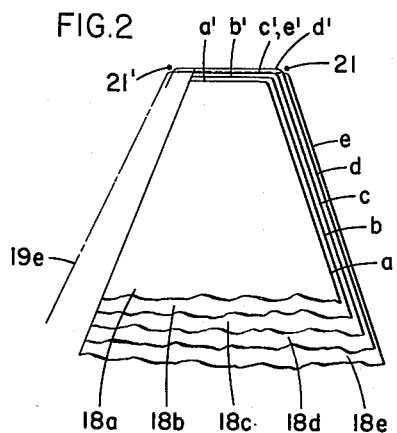
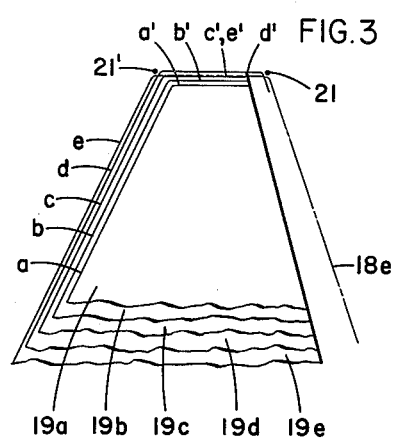
INVENTORS
CHARLES B. KING
BY GILMORE M. SPEAR
Richard W. Treverton
ATTORNEY

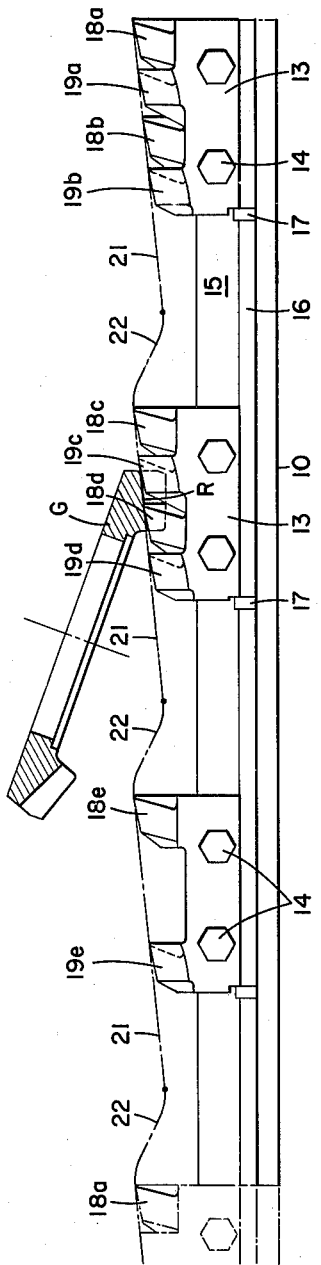
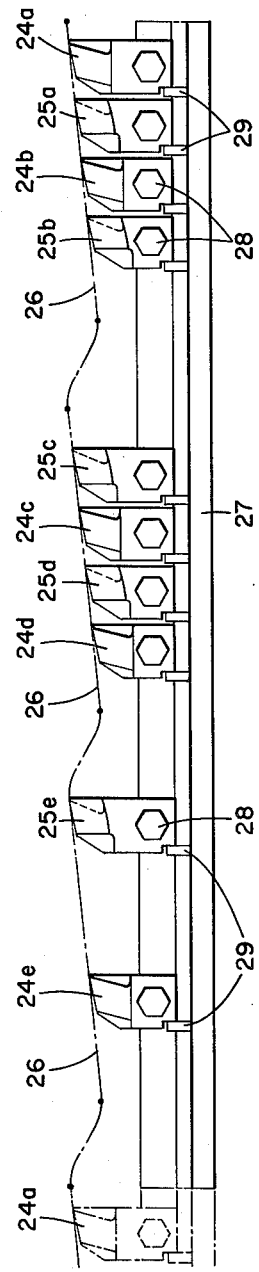
FIG. 4
FIG. 5

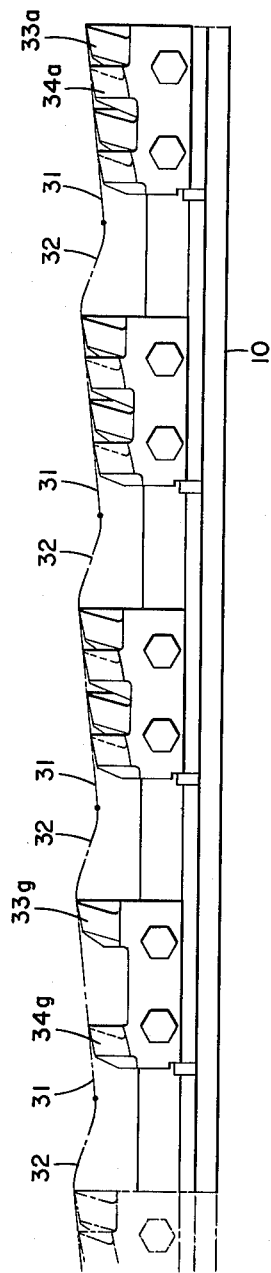
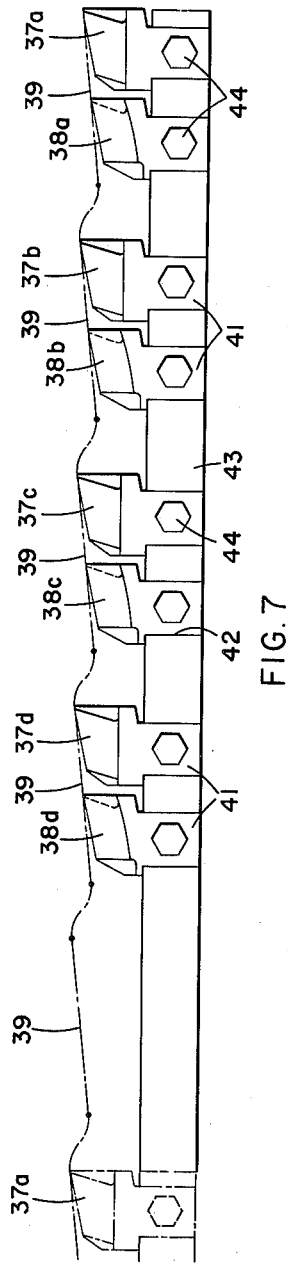
FIG. 6
FIG. 7

United States Patent Office 2,974,399
Patented Mar. 14, 1961

2,974,399

CUTTER FOR GEARS OF TAPERING TOOTH DEPTH

Charles B. King, Brighton, and Gilmore M. Spear, Rochester, N.Y., assignors to The Gleason Works, Rochester, N.Y., a corporation of New York Filed Mar. 27, 1958, Ser. No. 724,421

10 Claims. (Cl. 29—105)

The present invention relates to face mill cutters for cutting non-generated spiral bevel and hypoid gears of tapering tooth depth, by the method of Patent No. 2,857,819 of E. Wildhaber and C. B. King, and is adapted for use with a machine of the kind disclosed in application Serial No. 705,931, filed December 30, 1957, by L. O. Carlsen and C. B. King although it is not restricted to use with such machine.

According to the method the cutter while rotating is reciprocated axially so that its cutting blades move in a helical path while cutting, thus producing gear teeth whose sides are helicoidal surfaces. In the Wildhaber et al. patent all of the tooth side cutting blades are arranged along a single helix corresponding to the helical cutting path. Accordingly the cutter-carrying spindle of the machine is required to have a relatively long axial stroke and the high blades, at the forward end of the helix, project forwardly beyond the low blades by a correspondingly great distance. The gear being cut must be of such shape that the high blades will not interfere with it when the low blades are cutting, and this imposes a limitation on the design of the gear.

The preferred form of cutter disclosed in the Carlsen et al. application has a plurality of blades each lying along a separate helix coaxial with the cutter. The cutter is thus adapted to make an axial forward stroke as every blade cuts and a return stroke before the next blade enters the cut. This greatly reduces the magnitude of the axial stroke and its limitation on gear design, but the relatively large number of return strokes limits the number of blades that can be provided in the cutter. Moreover the axial reciprocation must be at relatively high frequency in relation to the rate of cutter rotation.

The primary objective of the present invention is a cutter which will, on one hand, avoid the long axial stroke that results from arranging all of the side cutting blades along a single helix, and yet which will, on the other hand, enable the cutter to reciprocate at much lower frequency and to employ more blades than the arrangement wherein every blade lies along a different helix.

According to the invention the blades are arranged around the cutter in groups, with every group of blades lying along a different helix and with sufficient spacing of the groups from one another to provide for the axial return strokes, but with all of the blades of any one group lying along the same helix. Because the number of groups is small the number of axial reciprocations is likewise small; and because every blade within a group lies along the same helix there is no limitation inherent in the arrangement as to the number of such blades. Likewise the axial reciprocations are relatively short, being only a fraction of the length required when all of the blades lie along a single helix.

Typical embodiments of the invention are shown in the accompanying drawings wherein:

Fig. 1 is a front view of a three-stroke cutter, i.e. one adapted for three reciprocations per rotation;

Figs. 2 and 3 are diagrams respectively showing the relative positions of the inside cutting blades and of the outside cutting blades of the cutter with respect to the helices along which they lie;

Fig. 4 is a side view of the cutter in development into a plane;

Fig. 5 is a similar plane development of another three-stroke cutter, employing a modified blade arrangement; and Figs. 6 and 7 are similar plane developments of a four-stroke cutter and of a five-stroke cutter, respectively.

Referring to Figs. 1 to 4 the cutter comprises a circular body or head 10 having a central bore 11 fitting the spindle of a gear cutting machine, the spindle (not shown) supporting the cutter for rotation about axis 12 and also for reciprocation along that axis. Three blade-carrying segments 13 are secured to the head by screws 14, the segments seating on the conical peripheral surface 15 of the head and against a peripheral flange 16 around the head. The segments also seat against positioning keys 17 which are secured in notches in the flange 16.

Each segment has a group of integral blades which project from the front face of the head in approximately the direction of cutter axis 12, the blades of all groups being arranged in a circle about the axis. The first two segments each have two inside and two outside cutting blades, with the inside and outside blades arranged alternately, while the third and last segment has only one inside finishing blade and one outside finishing blade. The inside blades are designated in their order of cutting by the reference characters 18a to 18e, the last being the finishing blade. Similarly, the outside blades are designated 19a to 19e.

The blades are arranged along helices 21 of constant axial lead corresponding to the axial advance of the cutter as it rotates, whereby the blades as they cut will follow along the root R of the tooth space being cut in the work gear G, Fig. 4. The three helices 21 are joined by return helical lines 22 which, as shown, are of varying lead, each being of approximately Z-shape in plane development.

The relationship between the blades and the respective helices 21 along which they lie is best explained with reference to Figs. 2 and 3. In these views the blades are shown as they would appear if all were moved along the connected helices 21, 22 into the same plane containing the cutter axis. As shown greatly exaggerated in these views the cutting edges of all of the blades do not actually touch the helix as Fig. 4 suggests. Instead they are spaced varying distances from the helix. As shown in Fig. 2 only the side cutting edge e of finishing inside blade 18e and the tip cutting edge d' of the next to last inside blade 18d would, if extended, intersect the helix 21. The other side edges are progressively offset inwardly from edge e while the tip edges are offset rearwardly from the edge d', the amount of offset corresponding to the thickness of stock each blade is to cut. For example, in a particular cutter of the kind illustrated, the edge d is offset from edge e by one thousandth of an inch so that the finishing cut will be of this thickness; edge c is offset from d by two thousandths; and b and a are respectively offset from c and a also by two thousandths. Tip edges c' and e' are both offset from d' by one and one half thousandths; b' from c' and e' by one and one half thousandths; and a' from b' also by one and one half thousandths. The corresponding side edges a to e and tip edges a' to e' of the outside blades 19a to 19e, Fig. 3, are similarly related to a helix 21' which is parallel to helix 21 (and is coincident with it in the developed view, Fig. 4). The distance separating the helices 21 and 21' in Figs. 2 and 3 represents the point width of the cutter. It will be understood that a cutter with the blade offsets described will be used for finish cutting gears which have previously been rough cut very close to finished size, i.e. gears in which stock of only up to about ten thousandths of an inch remains for removal from each tooth side in the finishing operation.

The tooth length of gear G is such that two of the blades 18a to 19d may be in the cut at the same time. However to assure a surface finish of the highest quality the final blades 18e and 19e are separated from each other, and also from the immediately preceding and the following blades, 19d and 18a, far enough that only one of the final blades, and no other blade, can be in the cut at a time. The groups of blades are so widely spaced, and in particular the last blade 19e is so far in advance of the first blade 18a, as to provide a gap wide enough to allow indexing of the work gear G to bring a succeeding tooth space thereof into position for cutting, whenever the gap comes abreast of the work, thereby obviating any necessity for cessation of cutter rotation during the finish cutting of all the teeth of the gear.

In the cutter shown in Fig. 4 the blades of every group are in the same position along their helix 21. That is, the first blade of each group, namely blade 18a of the first group, 18c of the second group or 18e of the third, is an inside blade (in this particular instance) and its cutting edge is at the extreme forward end of its helix. The last blades of all groups are outside blades and they are all at the same distance from the trailing ends of their helices. The blade edges of one group are spaced from the corresponding edges of an adjacent group by a fraction of the cutter circumference, in this case ⅓, which is the reciprocal of the number of helices. The arrangement is obtained by choosing a blade pitch angle, i.e. the angle about the cutter axis from the cutting edge of one blade to the cutting edge of the next blade of the same group, which is divisible into 360° by an even integral number which is a multiple of the number of helices. The blade pitch angle in this case is 15°, so that the even integral number is twenty-four, a multiple of the number of helices which is three.

In the cutter shown in Fig. 5 there is a different arrangement wherein the blades of the several groups are in different positions along their helices by reason of the number of blade pitches not being a multiple of the number of helices, which again is three. The blades of one group are spaced from the corresponding edges of an adjacent group by a fraction of the cutter circumference different from the reciprocal of the number of helices. The blade pitch angle is 18° with the advantage that the blades are substantially longer than those in Fig. 4 although the total number of blades is the same and nearly as large an indexing gap is provided between the last and first blades. The inside blades are designated 24a to 24e and the outside blades 25a to 25e. The first blade of the first group is an inside blade while the first blades of the second and third groups are outside blades. An advantage of the arrangement, additional to the greater blade length, is that the first finishing blade 25e is separated from the nearest blade by a greater distance than is the corresponding blade 18e in Fig. 4, so that the cutter is capable of cutting a gear of greater tooth length.

The offsetting of the several blades 24a to 24e from each other and from their respective helices 26, and the similar offsetting of blades 25a to 25e, may be the same as described in connection with Figs. 2 and 3. However the cutter of Fig. 5 differs from that of Fig. 4 in that each blade is independently secured to the cutter head 27 by a screw 28, and that a separate locating key 29 is provided for each blade.

The cutter shown in Fig. 6 is a four-stroke cuter, differing from the cutter of Figs. 1 to 4 in that it has four instead of three groups of blades. The blades of each group lie along a different helix 31 of constant lead, and the four helices are identical, are equally spaced about the cutter axis, and are connected to each other by four identical return helices 32. Alternate blades are inside cutting and outside cutting, the first two blades being designated 33a and 34a, and the two finishing blades being designated 33g and 34g. Inasmuch as there are two more inside blades and two more outside blades than in the cutter of Figs. 1 to 4 the blade offsets may be reduced so that the blades will take lighter cuts. In the alternative the same blade offsets may be used, in which case the additional blades enable the cutter to finish gears which have been rough cut less closely to finished size, without placing undue load on the first two blades.

In Fig. 7 a five-stroke cutter is illustrated. Eight blades are employed, the inside blades being designated 37a to 37d and the outside blades 38a to 38d. One inside and one outside blade are arranged along each constant lead helix 39. There are no blades along the fifth helix 39 so that a relatively wide gap is provided for indexing of the work gear. The blades may be offset from each other and from their helices in the same way as the last four blades in each of Figs. 2 and 3, or by a slightly greater amount in case the work gears have not been roughed closely to finished size. The arrangement has the advantage of relatively great blade length, permitting a large number of blade resharpenings and hence a long blade life. In the cutter illustrated the blade pitch angle is 27.5° but the cutting edges of adjacent blades of the same series, i.e. inside or outside, are spaced by 72° or one-fifth of cutter circumference. In this embodiment the blades are of the inserted type, each having a shank 41 inserted in a slot 42 in the periphery of the cutter head 43 and secured by a screw 44.

In all of the cutters shown the cutting side and tip faces of the blades, i.e. the surfaces back of the cutting edges, are preferably helicoidal surfaces whose helix axes are coincident with the cutter axis, so that upon resharpening of the blades, by grinding back their front faces by equal amounts, the relationship of the several side cutting edges and tip cutting edges is not changed. The axial lead of these helicoidal surfaces is sufficiently greater than the lead of the helices along which the blades are disposed, for example helices 21 in Fig. 4, that a suitable clearance angle is provided between the blade side and tip surfaces and the cut surfaces of the work gear. In order to provide such clearance the helix angle of the helicoidal surfaces of the blades is made about six degrees greater than the helix angle of the helices along which the blades lie.

It will be understood that the four cutters specifically shown and described are disclosed by way of illustration and example of the novel principles involved, and not by way of limitation, and that these principles may be employed in cutters of other design and arrangement without departing from the spirit of the invention or from the scope of the appended claims.

What we claim is:

1. A face mill cutter for non-generated spiral bevel or hypoid gears of tapering tooth depth, comprising a plurality of groups of cutter blades arranged in a circle on a rotary cutter head with the cutting portions thereof projecting from the head in an approximately axial direction, each such group of blades presenting at least one inside and one outside cutting edge, the blades of each group lying along a different helix coaxial of the cutter and the several helices all being substantially identical and being equally spaced from each other about the cutter axis.

2. A cutter according to claim 1 in which there is a helicoidal surface back of each of said cutting edges, said helicoidal surfaces having their helix axes coincident with said cutter axis and all having the same axial lead, said lead being greater than that of said helices whereby clearance is provided between said helicoidal surfaces and the work.

3. A cutter according to claim 1 adapted to reciprocate axially as it rotates, with the number of reciprocations per rotation corresponding to the number of said helices, and said cutter being adapted to cut only during forward strokes of such reciprocation by having the last blade of each group spaced from the first blade of the following group by an angle about the cutter axis greater than the angle by which the adjacent blades of any one of said groups are spaced and at least as great as the angular extent of the teeth being cut plus the angle of cutter rotation devoted to the intervening return stroke.

4. A cutter according to claim 1 adapted to finish cut a tooth space in a single revolution and in which successive inside cutting edges, and also successive outside edges, are progressively offset with respect to their related helices so that successive inside edges and successive outside edges will remove successive layers of stock when the cutter is reciprocated relative to the work, as it rotates, in a manner such that each edge while cutting follows a helical path identical with that followed by every other edge and of the same axial lead as said helices.

5. A cutter according to claim 4 in which at least the last inside cutting edge to cut and the last outside cutting edge to cut are arranged along a different helix than the other blades and are spaced circumferentially from each other, and from the immediately preceding and following blades, by a distance greater than the length of the tooth space being cut, whereby only one of said last blades, and no other cutter blade, can be in the cut at a time.

6. A cutter according to claim 5 in which the angular spacing of inside and outside cutting edges about the cutter axis is the same for every group of blades.

7. A cutter according to claim 6 in which the blades are omitted from one of the helices to provide a gap between the last and first groups of blades to cut to permit tooth-to-tooth indexing of the work.

8. A cutter according to claim 4 in which groups of blades other than the last group to cut comprise a plurality of inside cutting edges and a plurality of outside cutting edges.

9. A cutter according to claim 1 in which the blade edges of one group are spaced from the corresponding edges of an adjacent group by a fraction of the cutter circumference that is the reciprocal of the number of said helices.

10. A cutter according to claim 1 in which the blade edges of one group are spaced from the corresponding edges of an adjacent group by a fraction of the cutter circumference that is different from the reciprocal of the number of said helices.

No references cited.